United States Patent [19]

Volkert et al.

[11] 4,340,189
[45] Jul. 20, 1982

[54] RETURN FEED LOCKING MECHANISM FOR FISHING REELS

[75] Inventors: Bernd Volkert; Klaus Dörbandt, both of Berlin, Fed. Rep. of Germany

[73] Assignee: Deutsche Angelgerate Manufaktur (DAM) Hellmuth Kuntze Gesellschaft & Co. KG, Berlin, Fed. Rep. of Germany

[21] Appl. No.: 254,031

[22] Filed: Apr. 14, 1981

[51] Int. Cl.³ .................... A01K 89/02; F16D 63/00
[52] U.S. Cl. ................... 242/84.1 R; 74/576; 188/82.3; 188/82.4
[58] Field of Search .......... 242/84.1 R, 84.2 R, 242/84.2 A, 84.26, 84.21 R, 84.51 A, 84.51 R, 84.5 R, 84.5 A; 188/82.4, 82.3, 82.34; 74/576

[56] References Cited

U.S. PATENT DOCUMENTS

| | | | |
|---|---|---|---|
| 2,354,530 | 7/1944 | McMahon | 74/576 X |
| 3,489,365 | 1/1970 | Hull | 242/84.5 R |
| 4,193,562 | 3/1980 | Gifford | 242/84.2 G |
| 4,201,355 | 5/1980 | Ruin | 242/84.1 R |
| 4,300,730 | 11/1981 | Carlsson et al. | 242/84.2 R |

*Primary Examiner*—Billy S. Taylor
*Attorney, Agent, or Firm*—Allison C. Collard; Thomas M. Galgano

[57] ABSTRACT

A return feed locking or anti-reverse mechanism is provided to prevent reverse (unwinding) rotation of fishing reel winder. The fishing reel includes a crank operated driving shaft for rotating gearing connected to a driven shaft and line winder. The anti-reverse mechanism includes a ratchet attached to the driven shaft and engaged by a pivoted pawl or bolt to limit rotation of the winder to a single, winding direction. The pawl is pivotally mounted and interconnected to a rotational responsive spring ring carried on the driving shaft. The pawl also includes a forked end of appropriate proportions to receive a manually positioned adjustment member. The adjustment member includes a button slidable on the housing between three defined positions. As the button is shifted it moves the remote end of the adjustment member, which is disposed in forked end of the pawl, to selective dispose the pawl in: (1) one end position in engagement with the ratchet; (2) an intermediate position where the rotational responsive, spring ring is free to control the pawl position, or (3) an opposite end position where the pawl is free of the ratchet. The adjustment member is assembled by positioning it inside the reel housing in alignment with a headed pin of the slidable button which is inserted from outside the reel to pierce an appropriately shaped aperture in the adjustment member.

3 Claims, 8 Drawing Figures

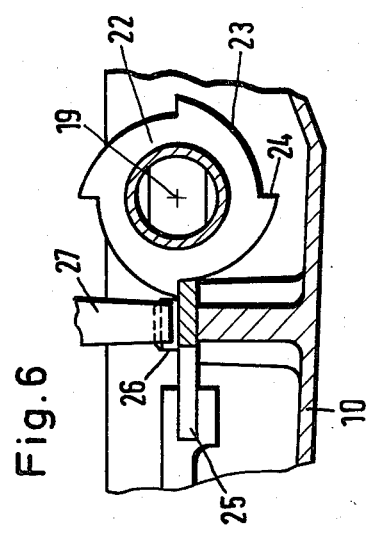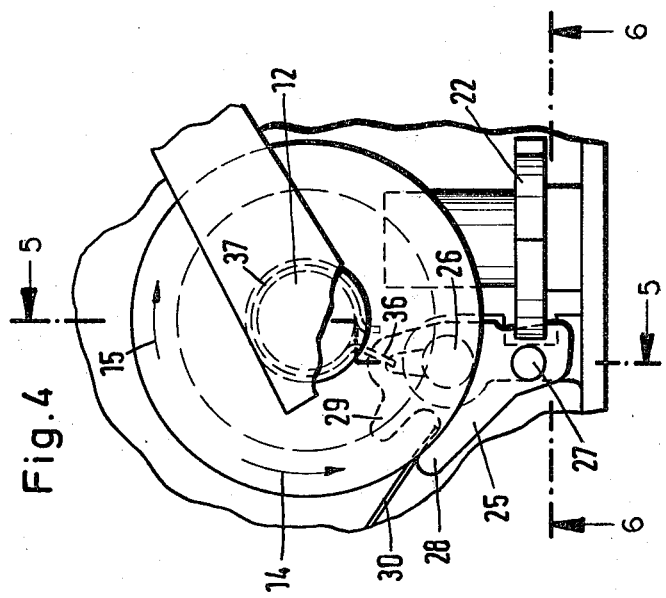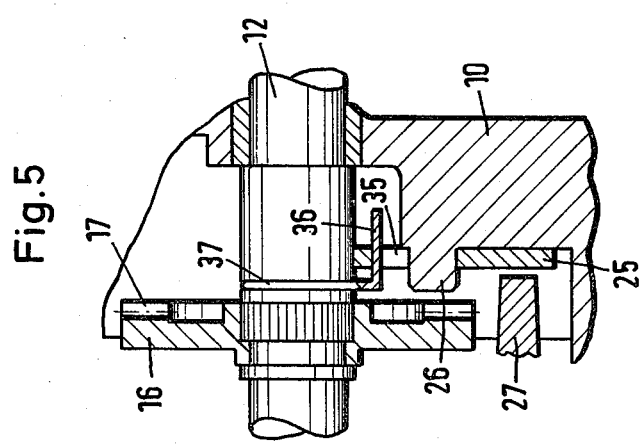

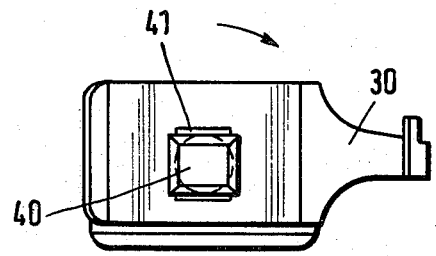
Fig. 7
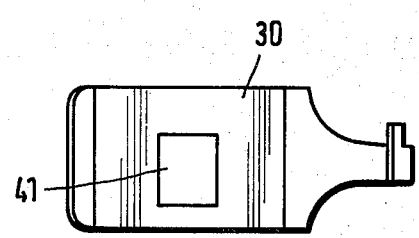
Fig. 8
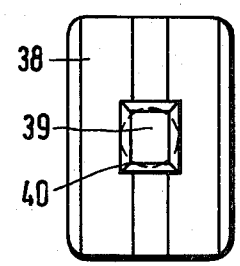

RETURN FEED LOCKING MECHANISM FOR FISHING REELS

The present invention relates to a return feed locking or arresting mechanism or flyback suppressor for fishing reels. More particularly, it relates to such a mechanism which includes a housing, a drive shaft, a driven shaft, a stationary pin mounted in the housing disposed parallel to the drive shaft, a yielding or resilient adjustment member which is arrestable at two end positions on the housing and a bolt which is pivotably mounted on the stationary pin of the housing which bolt in its one end position blocks an arresting wheel mounted on the drive shaft, which simultaneously operates as a ratchet.

If a return feed locking or arresting mechanism is actuated in a fishing rod reel of the aforementioned type, the yielding or resilient adjustment member is moved over the cam faces which are disposed between the ratchet teeth of the ratchet wheel, against the spring force, and it snaps back behind the next ratchet tooth at the end of each cam face, thereby making a ratchet noise when winding up or reeling in the fishing line.

It is therefore an object of the invention to provide an improved return feed locking mechanism for fishing rod reels of the aforementioned type which, during operation of the return feed locking mechanism, allows the reeling in or winding up of the fishing line, either with or without an accompanying ratchet noise.

This object of the invention is obtained by the provision of a return feed locking mechanism of the aforementioned type characterized by the following features:

(a) the adjustment member freely engages with its free end in a fork of the bolt and with its other displaceable end it is also movable to a central position on a housing wall opposite to the fork;

(b) the width of the fork of the bolt is at least as large as the path of the parts toward the drive shaft and away from the pin effecting the arresting of the bolt between the two end positions thereof;

(c) the drive shaft is frictionally encompassed by a spring ring which, in the reeling up direction, has a front bent end which engages a slot of the bolt disposed between the pin and the drive shaft;

(d) the spring force of the spring ring is lower than that of the yielding adjustment member;

(e) in the first end position, the adjustment member pushes the bolt into its arresting position, due to its spring force;

(f) in the center position of the adjustment member, the adjustment member is free from tension and the spring ring pushes the bolt into the release position during winding up of the line and into the arresting position during the release of the line; and (g) in the other end position, the adjustment member acts on the other shank of the fork, due to its spring force and pushes the bolt into the release position, whereby the spring force of the spring ring is overcome during this release movement.

In the inventive embodiment, the return feed locking mechanism operates in two end positions in the hitherto known manner. Furthermore, in the tension-free center position of the adjustable member, this member acts as an abutment for the bolt whose movement in this position is controlled by the spring ring, the bolt being moved during the winding up to its switch-off position and during the release or flyback into its switch-on operating position.

Other objects and features of the present invention will become apparent from the following detailed description when taken in connection with the accompanying drawings which disclose one embodiment of the invention. It is to be understood that the drawings are designed for the purpose of illustration only and are not intended as a definition of the limits of the invention.

In the drawings, wherein similar reference characters denote similar elements throughout the several views:

FIG. 4 is a fragmentarily-illustrated side view similar to that of FIG. 1;

FIG. 5 is a sectional view taken along line 5—5 in FIG. 4;

FIG. 6 is a sectional view taken along line 6—6 in FIG. 4;

FIG. 7 is a front view of one end of the adjustment member having an adjustment button coupled thereto; and FIG. 8 is a front view of the parts shown in FIG. 7, prior to assembly.

Figure 1:
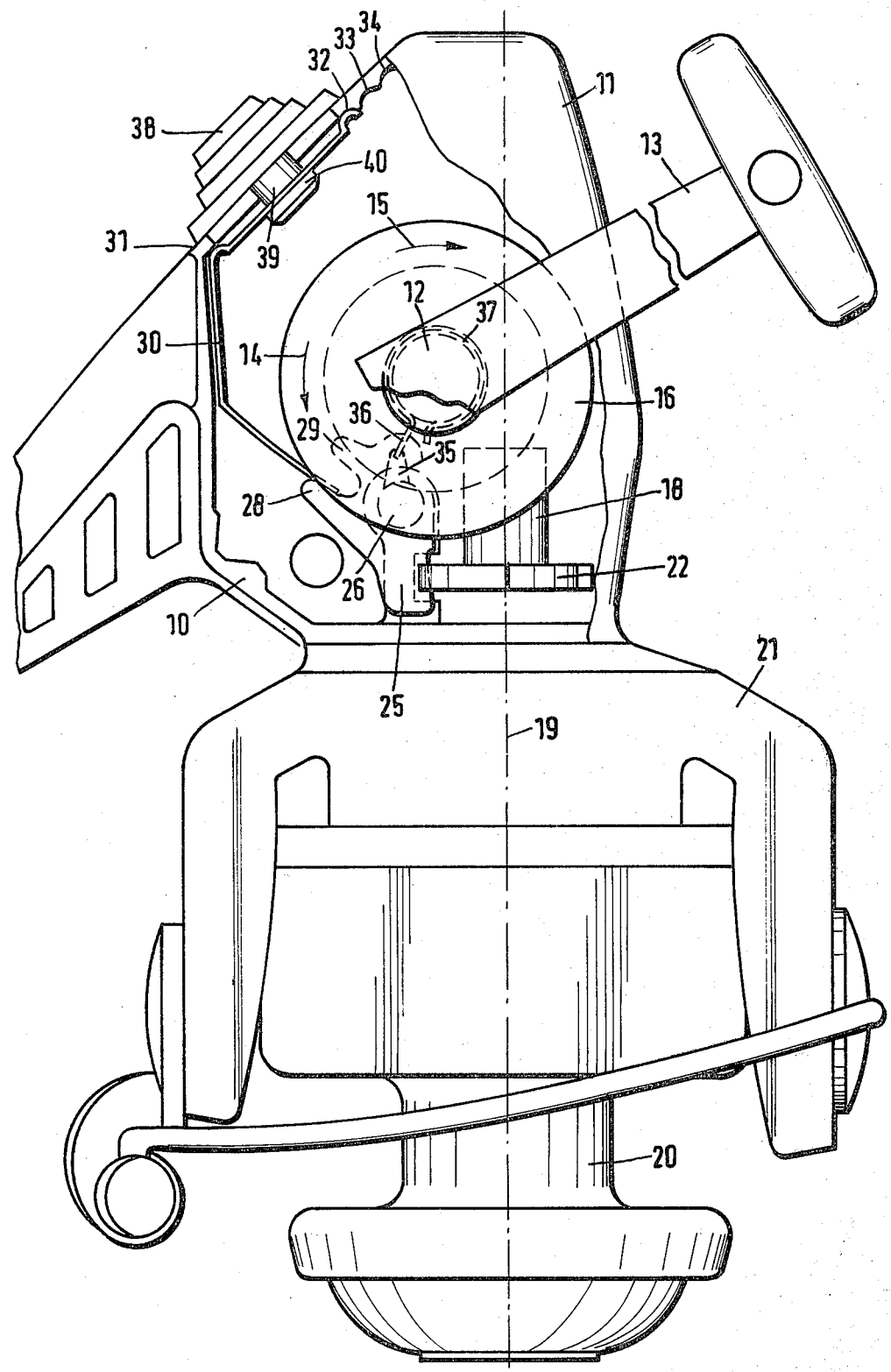
FIG. 1 is a side view of a fishing reel embodying the present invention, with a partly removed housing cover, showing actuation of the return feed locking mechanism with the adjustment member in one end position.

Referring now in detail to the drawings, therein illustrated is a fishing reel having a housing 10 with an open side face which is covered by a housing cover 11. A drive shaft 12 is mounted in the housing and the housing cover and it is connected with a crank handle 13 by which drive shaft 12 is turned for winding up or reeling in the fishing line (in the direction of the arrow 14) and for releasing the fishing line (in the direction of arrow 15). An input wheel 16 is mounted on drive shaft 12 which drives via gear teeth 17 (FIG. 5) a screw or worm 18 on a driven shaft 19. A fixed spool 20 is mounted on driven shaft 19 and is coupled with a winding or coiling flange 21 for the fishing line.

The fishing reel is provided with a selectively actuable return feed locking mechanism which prevents a rotation of the drive shaft in the direction of arrow 15. This return feed locking mechanism comprises a ratchet wheel 22 (see FIG. 6) which is mounted next to worm 18 on driven shaft 19. Ratchet wheel 22 is provided with a plurality of ratchet teeth 24 which are distributed over the circumference thereof and which are connected with each other by means of cam faces 23.

A bolt 25 cooperates with ratchet wheel 22, and it pivots around a stationary pin 26 mounted parallel to drive shaft 12. Bolt 25 is held in place by a hold down device 27 (FIG. 5) mounted on housing cover 11. One arm of bolt 25 cooperates with ratchet wheel 22 and on its other arm a fork with two shanks 28 and 29 is disposed between which the free end of an adjustment member or vane 30 engages freely.

Adjustment member 30 is in the form of a spring, one end of which is displaceably mounted on the housing wall 31 disposed generally opposite to the fork and it is adjustably mountable thereon in three different positions by means of three catches 32–34. Furthermore, a slot 35 is provided on the other arm of bolt 25 facing drive shaft 12 in which the bent end 36 (FIGS. 1 and 5) of a spring ring 37 is received. Spring ring 37 has an annular cross section and it engages in a frictional manner a corresponding annular groove on drive shaft 12. Its spring force is lower than that of adjustment member 30.

The displacement of adjustment member 30 is carried out by an adjustment button 38 which is displaceably guided on housing wall 31 and is coupled with adjustment member 30 by means of a pin 39 which is provided with an enlarged head 40. A rectangular aperture 41 (see FIGS. 7 and 8) is formed in adjustment member 30 for coupling purposes through which head 40 can be inserted when displaced by about 90° relative to its final assembly position. After inserting the head and turning it by 90°, head 40 is locked in position and adjustment member 30, together with the associated adjustment button 38, is held in its intended position by the mounted housing cover 11.

In FIG. 1, the return feed locking mechanism is shown in an operative switched-on position, so that a ratchet noise occurs during winding. In this position, adjustment member 30 is held stationary in catch 32 and its free end is pushed by spring force against shank 28 of the fork of bolt 25. Bolt 25 is thereby pushed into an arresting or locking position whereby it engages behind an arresting tooth or ratchet 24 (FIGS. 1 and 6). The spring force of the frictionally movable spring ring 37 acts in the same direction. When turning in the direction of arrow 14, i.e., when winding up the fishing line, a ratchet noise occurs on the ratchet wheel 22, the noise being generated by the movement of the adjustment member over the cam faces 23 and its snapping back following passage past ratchets 24.

Figure 2:
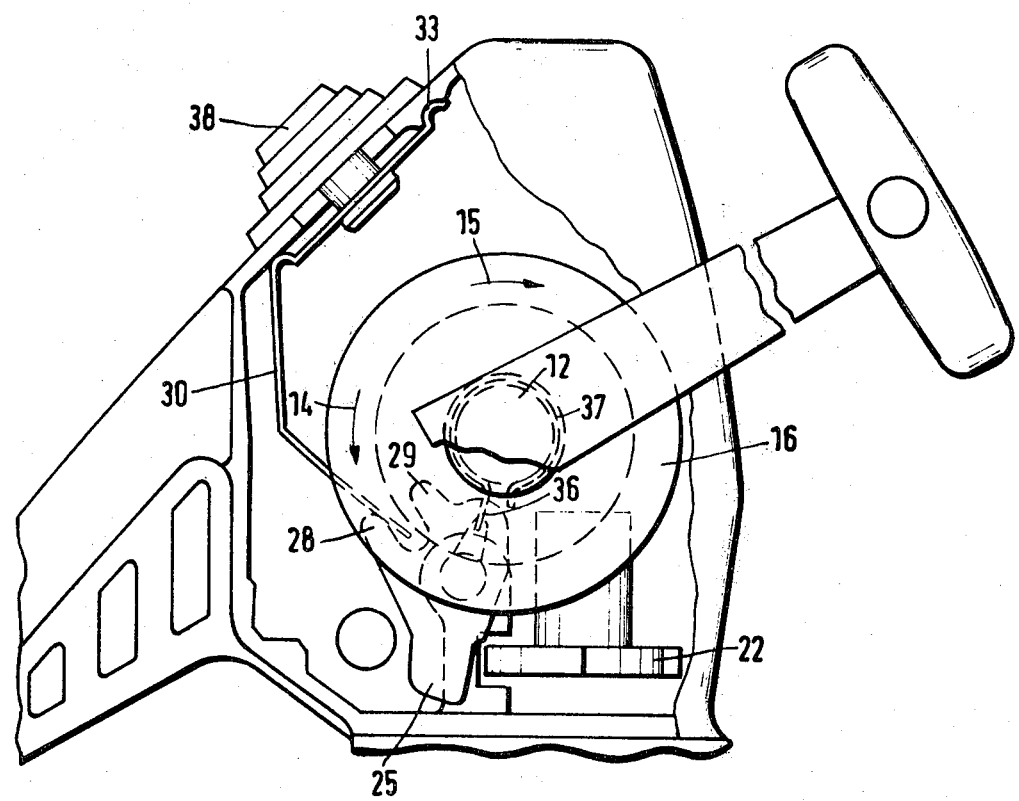
FIG. 2 is a fragmentarily-illustrated side view comparable to that of FIG. 1, showing the adjustment member in its center position.

If, on the other hand, the fisherman wishes to avoid the ratchet noise, he moves adjustment button 38, so that adjustment member 30 is arrested in catch 33 (FIG. 2). In this position, adjustment member 30 is tension free and constitutes an abutment for bolt 25 on which the spring force of spring ring 37 alone is effective. When turning drive shaft 12 in the direction of arrow 14, the moving spring ring 37 pivots bolt 25 into an inoperative or switched-off position which is shown in FIG. 2. However, when turning in the direction of arrow 15, bolt 25 is brought into its arresting or locking position, whereby the free end of the tension-free adjustment member 30 is, in effect, moved towards shank 29 of the fork. Therefore, the width of the bolt fork must be at least as large as the path of the part which effects the locking of bolt 25 between its operative and inoperative positions.

Figure 3:
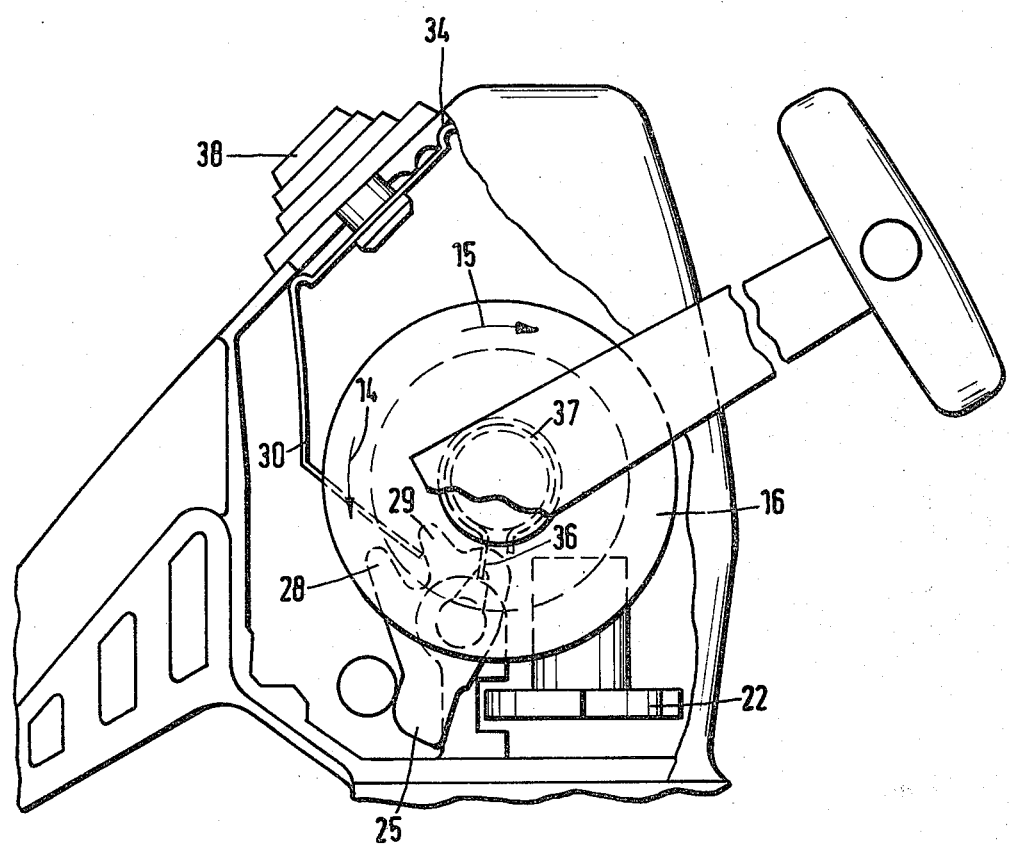
FIG. 3 is a fragmentarily-illustrated side view comparable to that of FIG. 1, showing the adjustment member in its other end position to effect deactivation of the return feed locking mechanism.

The locking means is rendered inoperative or switched-off when adjustment member 30 is positioned in catch 34 (FIG. 3). In this case, adjustment member 30 pushes with its spring force on shank 29 of the bolt 25 and pivots the bolt into the inoperative or switched-off position. When turning drive shaft 12 in the direction of arrow 15, the spring force of the moving spring ring 37 operates in a manner to urge the switching-on of the return feed locking mechanism, but this force is overcome by the stronger spring force of adjustment member 30.

Thus, while only one embodiment of the present invention has been shown and described, it will be obvious that many changes and modifications may be made thereunto, without departing from the spirit and scope of the invention.

What is claimed is:

1. A return feed locking mechanism for a fishing reel, comprising:
    a housing;
    a drive shaft rotatably mounted in said housing;
    a driven shaft rotatably mounted in said housing and operatively coupled to said drive shaft for effecting rotation thereof;
    a ratchet wheel mounted on said driven shaft;
    a resilient adjustment member displaceably mounted in said housing which member is arrestable in a first end position, a central position, and a second end position, said adjustment member having an actuating arm;
    a stationary pin mounted in said housing disposed parallel to said drive shaft;
    a bolt having two ends pivotably mounted on said pin for movement between two end positions in which one end thereof is moved into, and out of, an arresting and release position, respectively, with respect to said ratchet wheel, the other end of said bolt being forked to define a pair of spaced-apart shanks between which said actuating arm of said adjustment member engages, said shanks defining a width therebetween which is about at least equal to the path of said actuating arm as it moves away from said pin and toward said drive shaft during movement of said adjustment member between said end positions thereof, said bolt also having a slot formed therein disposed between said pin and said drive shaft;
    a spring ring frictionally mounted on said drive shaft having a bent end which engages said slot of said bolt when said drive shaft is rotated in a reeling-in direction and which has a spring force which is lower than that of said resilient adjustment member; and
    wherein in the first end position of said adjustment member, said adjustment member pushes the bolt into its arresting end position due to its spring force, wherein in the center position of the adjustment member, said adjustment member is free from tension and said spring ring pushes said bolt into said release end position thereof when said drive shaft is rotated in a reeling-in direction and into the arresting position thereof when said drive shaft is rotated in a line-releasing direction and wherein in the second end position of said adjustment member, said adjustment member acts on the other shank of said fork due to its spring force, and pushes the bolt into the release position, whereby the spring force of the spring ring is overcome during such releasing movement.

2. The return feed locking mechanism according to claim 1, wherein said spring ring has an annular cross section and wherein said drive shaft has a corresponding annular groove in which said spring ring is received.

3. The return feed locking mechanism according to claim 1, said adjustment member including an adjustment button slidably mounted on said housing, exteriorly of said housing, and having a pin extending into said housing which has a head on the free end thereof and wherein said adjustment member has an opposite end provided with a rectangular aperture through which said pin is insertable, said head of said pin being dimensioned and configured relative to said aperture such that it is guidable therethrough only when disposed at about a 90° angle with respect to its assembled position, thereby effecting a coupling of said button with said adjustment member when in its desired mounted position.

* * * * *